(12) United States Patent
Katz et al.

(10) Patent No.: US 6,247,648 B1
(45) Date of Patent: Jun. 19, 2001

(54) BAR CODE SCANNER UTILIZING MULTIPLE LIGHT BEAMS OUTPUT BY A LIGHT BEAM SPLITTER

(75) Inventors: Joseph Katz, Stony Brook; Boris Metlitsky, Mt. Sinar, both of NY (US); Emanuel Marom, Tel Aviv (IL)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/301,633

(22) Filed: Apr. 29, 1999

(51) Int. Cl.[7] ..................................................... G06K 7/10
(52) U.S. Cl. ................................ 235/462.42; 235/462.01
(58) Field of Search ........................ 235/462.01, 472.01, 235/462.45, 462.41, 462.43, 462.32, 462.25, 462.37, 462.36

(56) References Cited

U.S. PATENT DOCUMENTS

| | | | |
|---|---|---|---|
| 5,256,864 | * | 10/1993 | Rando et al. ........................ 235/462 |
| 5,258,605 | * | 11/1993 | Metlitsky et al. ................... 235/462 |
| 5,545,886 | * | 8/1996 | Metlitsky et al. ................... 235/462 |
| 5,565,668 | * | 10/1996 | Reddersen et al. ................. 235/462 |
| 5,869,827 | * | 2/1999 | Rando ........................... 235/462.04 |
| 5,912,450 | * | 6/1999 | Katz et al. ......................... 235/462 |
| 5,945,670 | * | 8/1999 | Rudeen ............................. 250/235 |
| 5,945,676 | * | 8/1999 | Khalil et al. ................... 250/339.12 |

* cited by examiner

Primary Examiner—Thien M. Le
(74) Attorney, Agent, or Firm—Kirschstein, et al.

(57) ABSTRACT

A bar code scanner and method for scanning a bar code symbol that splits a light beam using a liquid crystal device and directs the split light beams toward a bar code symbol using a moveable mirror. The light reflected by the symbol from each of the split light beams is summed and converted to an electrical signal indicative of the bar code symbol. The electrical signal is processed to decode the bar code symbol, but, if decoding is unsuccessful, the liquid crystal device is changed to affect the number of split light beams incident on the bar code symbol.

21 Claims, 6 Drawing Sheets

BAR CODE SCANNER UTILIZING MULTIPLE LIGHT BEAMS OUTPUT BY A LIGHT BEAM SPLITTER

BACKGROUND OF THE INVENTION

This invention relates to bar code reader devices, and more particularly to apparatus for generating a scanned light beam for use in reading bar code symbols.

Bar code readers are disclosed in U.S. Pat. Nos. 4,387,297, 4,409,470, 4,251,798, and 4,760,248, all assigned to Symbol Technologies, Inc. The bar code readers described in these patents, as well as other devices of this type that are commercially available, usually employ oscillating mirrors or similar mechanical means to generate a scanning pattern. While such devices are widely used in retail and other business establishments today and have been quite successful in accomplishing their objectives, there is nevertheless a continuing requirement to improve reliability, reduce power consumption, reduce size and weight, lower the parts cost and manufacturing cost, and increase the speed and accuracy of operation. One of the elements of the prior bar code scanners most susceptible to improvement along these lines is the mechanical scanner device. The scanner devices may consist of a mirror mounted on a stepper motor; the mirror includes a flat portion to direct the outgoing laser beam and also a concave portion to collect reflected light and focus it upon a photodetector.

Bar code readers employ decoding circuitry to interpret the signals produced by a photodetector receiving the reflected light from the bar code symbol. Conventional decoding schemes rely upon data collected by a single scanning spot moved linearly across the field where the bar code symbol is located. The bar code data is embedded in background noise, and the decoding circuitry is more effective if the signal can be enhanced. To this end, faster scanning rates would permit the implementation of multiple scans to increase reliability of the data collected, but the mechanical scan generators previously used constrict the speed and thus place limitations on the multiple scan approach.

It is the principal object of the invention to provide a bar code reader or the like that does not require mechanical devices such as oscillating mirrors to cause a light beam to scan a symbol to be read. Another object is to provide a bar code reader that is capable of faster scan, as by implementing the scan with no moving parts. A further object is to take advantage of fast scanning techniques to provide multiple scans to thereby increase the signal recovery ability, i.e., increase the likelihood of recovering a valid decode of the bar code signal. In addition, the capability of providing multiple scans using a fast scan method permits improved facility for reading two dimensional bar code symbols of the type having multiple rows of bar code patterns. Other objects include reducing the size, weight and power consumption of a laser scan type of bar code reader, as well as reducing the manufacturing cost and increasing the reliability and operating lifetime of such devices.

SUMMARY OF THE INVENTION

To achieve the objects and in accordance with the purpose of the invention, as embodied and broadly described herein, a bar code scanner includes a light source for generating a light beam, a liquid crystal device for splitting light beams, a mirror system for directing the split light beams toward a bar code symbol, and a photodetector for summing the light reflected by the bar code symbol from each of the split light beams and generating an electrical signal for processing to decode the bar code symbol. A microprocessor signals the liquid crystal device to alter the splitting of the light beam when the bar code symbol is not successfully decoded, in an attempt to obtain a successful reading of the bar code symbol.

In accordance with another embodiment of the present invention, a method is provided for reading a bar code symbol, comprising the steps of generating and splitting a light beam, directing the light split beams toward a bar code symbol and detecting and summing the light reflected by the bar code symbol from each of the split light beams. An electrical signal, indicative of the summed light, is processed to decode the bar code symbol. If this decoding is not successful, the split light beams are modified for subsequent reading of the bar code symbol.

BRIEF DESCRIPTION OF THE DRAWINGS

The novel features characteristic of the invention are set forth in the appended claims. The invention itself, however, as well as other features and advantages thereof, will be best understood by reference to a detailed description of specific embodiments, when read in conjunction with the accompanying drawings, wherein:

FIG. 4 is a timing diagram showing events or voltage vs. time for certain occurrences in the system of FIG. 1;

DETAILED DESCRIPTION OF THE PREFERRED EMBODIMENTS

Figure 1:
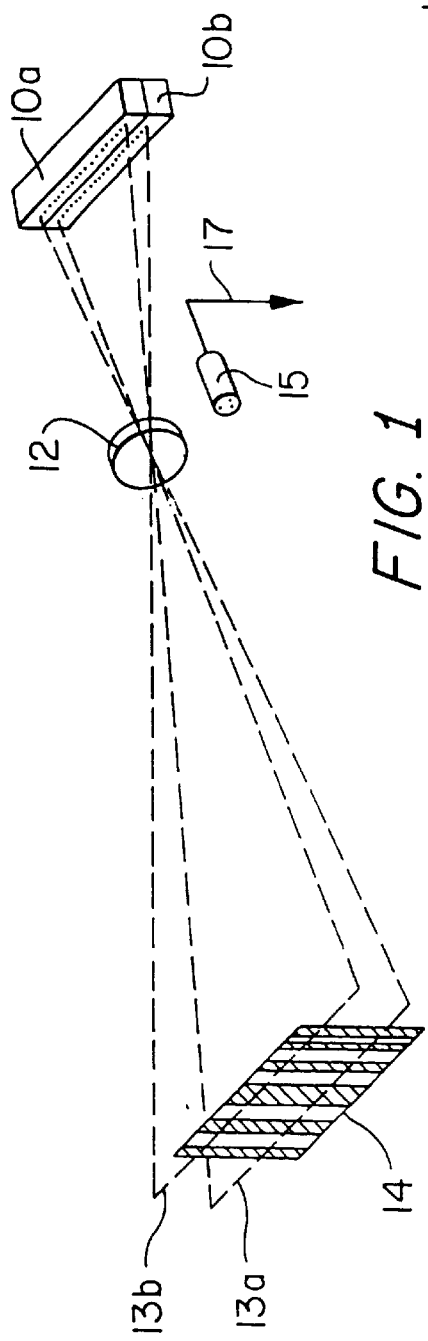
FIG. 1 is a diagram in schematic form of a bar code scanner employing dual linear arrays of light sources instead of a single array as in FIG. 1, according to another embodiment of the invention.
Figure 3:
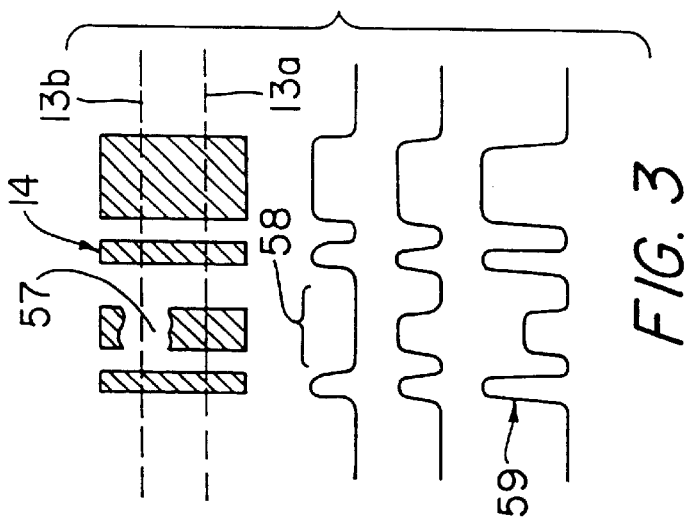
FIGS. 3 and 4 are timing diagrams showing events or voltage vs. time for certain occurrences in the system of FIG. 1 illustrating compensation for faults in the bar code.
Figure 2:
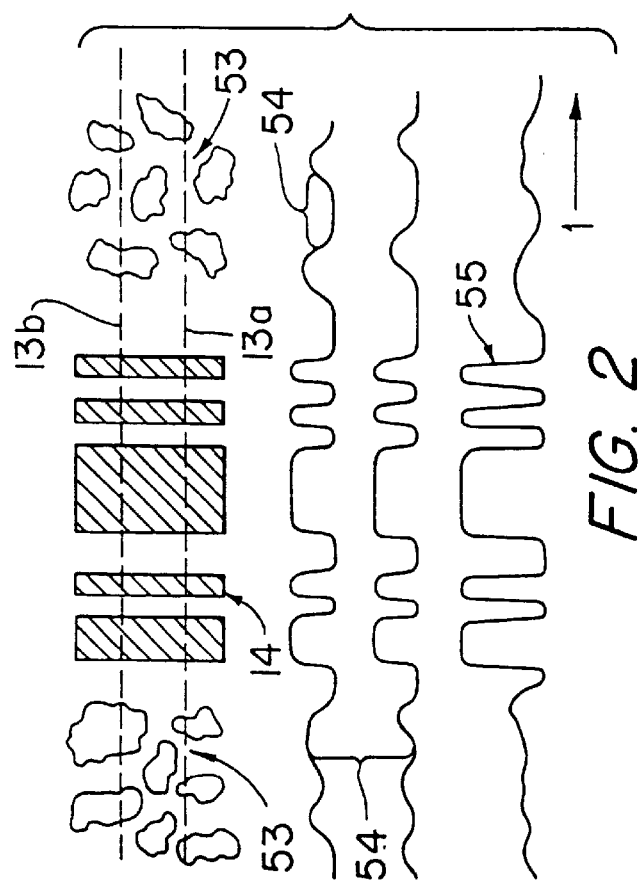
FIG. 2 is a timing diagram showing events or voltage vs. time for certain occurrences in the system of FIG. 7 illustrating the cancellation of background noise.
Figure 4:
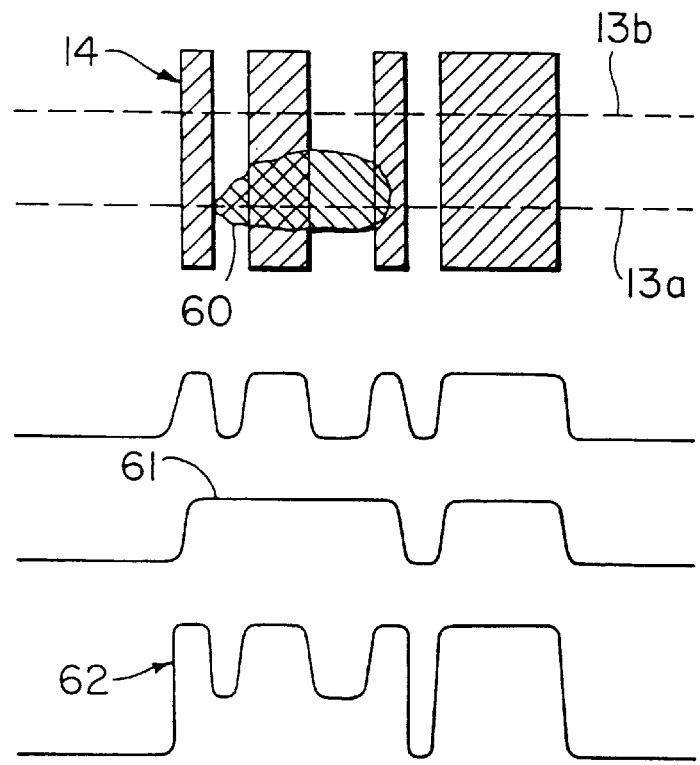

FIG. 1 shows a scanning that uses two linear arrays 10 and 10b. Use of two arrays 10a and 10b provides two scan lines 13a and 13b, one above the other, separated from one another by a distance corresponding to the physical separation of the arrays 10a and 10b and the magnification in the optical system 12. This dual scan line technique may be advantageously employed in several ways. First, if the two rows of laser diodes 11 in the two arrays 10a and 10b are activated in parallel, in the same sequence, then the two scan lines 13a and 13b are likewise in sync: in this case if the two scan lines traverse the same bar code symbol 14, the reflected light received by the photodetector 15 is also in sync from the two scans 13a and 13b. The advantage of having two scan lines may be understood by reference to FIG. 2, where the background areas 53 are seen to return uncorrelated signals 54, whereas the bar code symbol returns correlated waveforms from the two parts of the symbol 14 being scanned by the two scan lines 13a and 13b. The single detector 15 collects reflected light from the two scans at the same time and sums the intensities of the reflections, so the contrast of the overall signal 55 detected from the bar code 14 is enhanced. On the other hand, the areas 53 outside the bar code symbol 14 will result in different signals, and so the overall contrast from these areas is reduced. The digitizing circuitry used to shape the analog waveform on the line 17 and recover the bar code information can more readily distinguish the transitions in the bar code region of the signal from the uncorrelated returns from the areas 53. Referring to FIGS. 3 and 4, another advantage to the dual scans of FIG. 1 is that bar code imperfections can be compensated for. If the bar code symbol 14 has a defect in the form of a gap 57 as seen in FIG. 3, then the signal returned by the scan line 13b would have a corresponding false area 58 whereas the return from the scan line 13a would be valid. The composite signal 59 on the line 17 at the output of the photodiode 15 would still be able to be interpreted to recover valid data. Similarly, as illustrated in FIG. 4, if the defect is in the form of a black spot 60, the light return for one scan line will have a false area 61 appearing as if there was a very wide bar in the symbol, but the composite electrical signal 62 representing the sum of both scans 13a and 13b has distinct transitions and can be decoded to produce valid bar code data.

Figure 5:
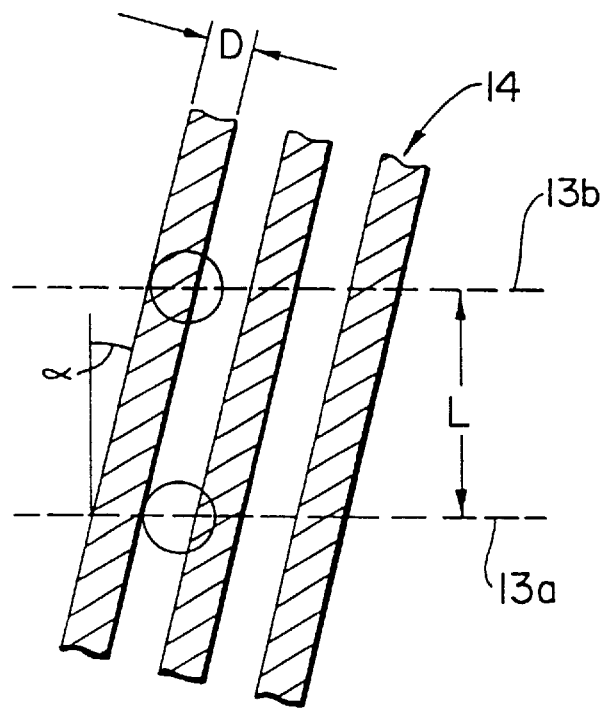
FIG. 5 is an enlarged view of a bar code symbol being scanned by dual light beams, illustrating permissible tilt.

When two scan lines 13a and 13b are used as illustrated in FIG. 1, the scan lines should be perpendicular to the individual bars of the symbol 14. The permissible misalignment depends upon the bar code density and the amount of physical separation between the two scan lines 13a and 13b. Referring to FIG. 5, assuming the diameter of the spot in the scan lines 13a or 13b to be larger than the minimum width D of a bar (or space), the maximum permissible tilt angle α is given by $$\tan\alpha \approx (0.5\ D)/L$$

where L is the separation between the two scan lines 13a and 13b.

In FIG. 1 an embodiment of the invention is shown having two arrays 10a and 10b, producing two scan lines 13a and 13b, but the number can be larger than two. Three or more scan lines provide the same types of benefits as just discussed, but to a greater degree. In addition, however, the capability of simultaneously scanning multiple bar code patterns is available.

Figure 6:
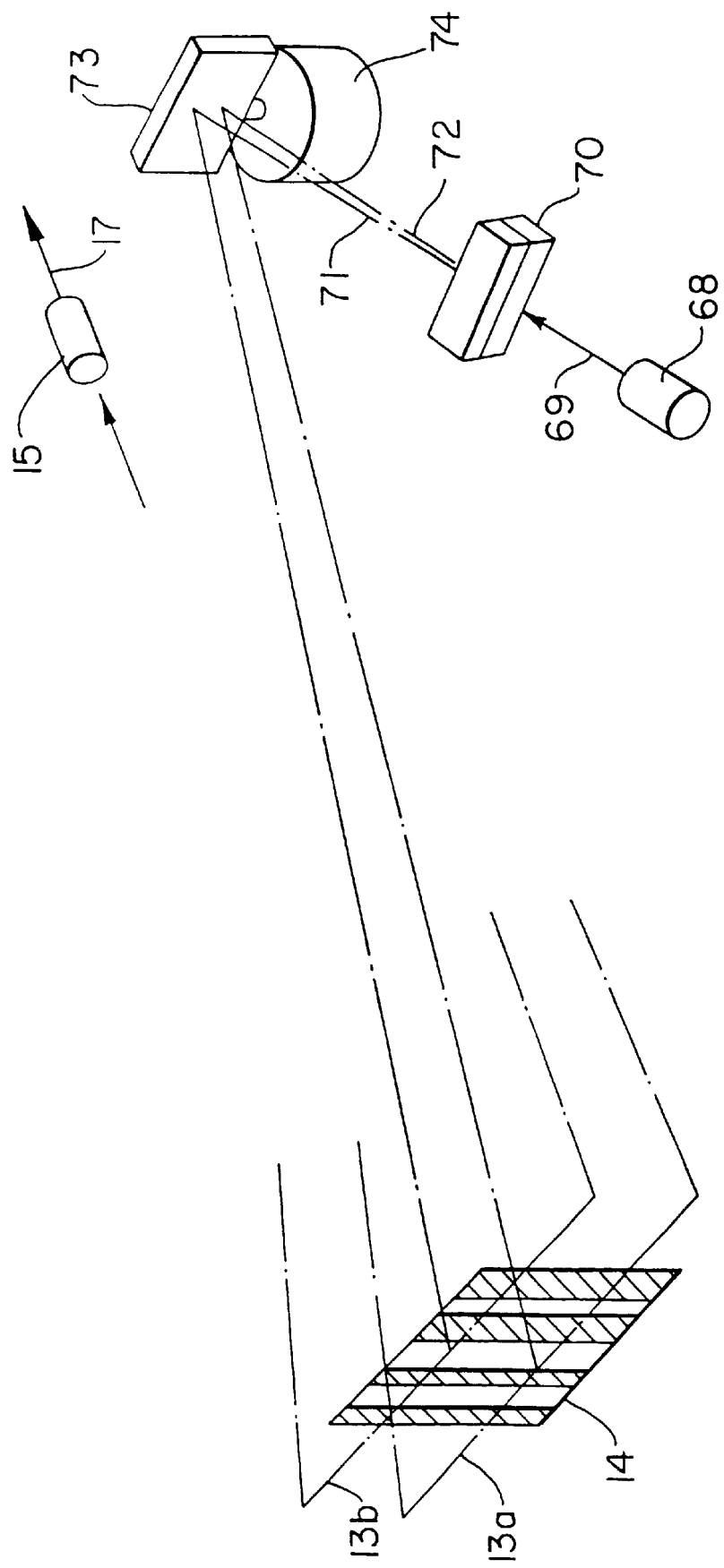
FIG. 6 is a pictorial view of a bar code scanner system corresponding to FIG. 1, employing two scan lines, but using a single light source along with a beam splitter.
Figure 7:
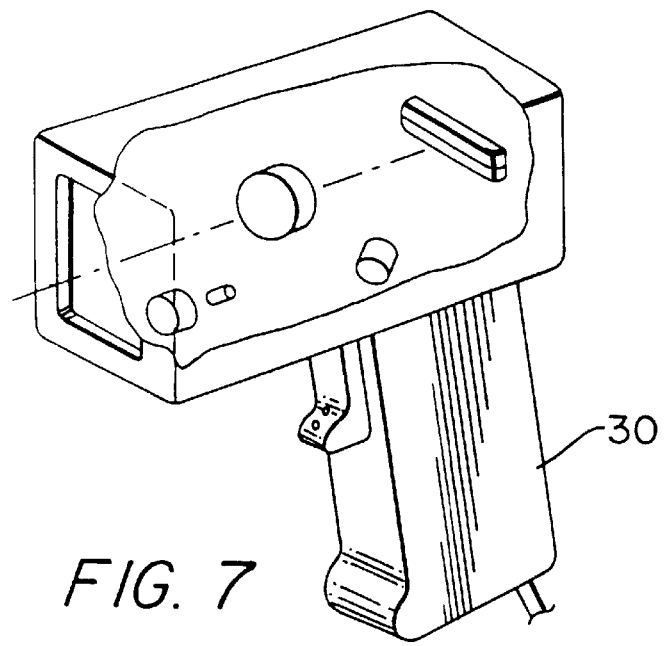
FIG. 7 shows a hand held housing.
Figure 8:
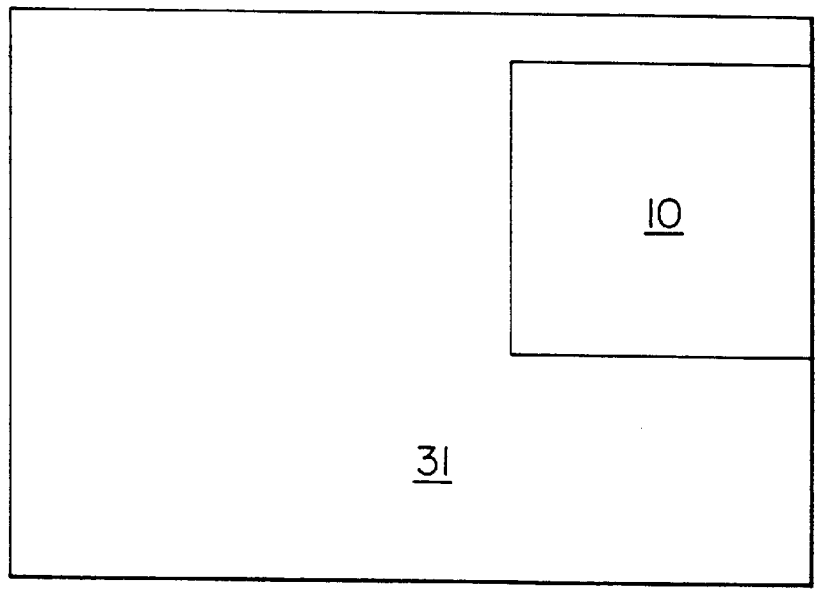
FIG. 8 shows a stationary housing.

Referring now to FIG. 6, a bar code scanner may produce dual scan lines 13a and 13b as in FIG. 1, but, according to another embodiment of the invention, the dual scan lines are produced by a single light source 68 emitting a beam 69 that passes through a beam splitter 70 to generate two separate beams 71 and 72. The two beams are directed to a scanning mirror 73 driven by a motor 74, from which the beams are directed out through a suitable lens system 75 to impinge upon the bar code symbol 14 as the two scan lines 13a and 13b. The assembly of FIG. 6 may be mounted in a hand-held housing 30 shown in FIG. 7, or as scanner 10 attached to stationary housing 31 in FIG. 8. The embodiment of FIG. 6 operates to provide improved resolution and decoding as discussed above with reference to FIGS. 2, 3 and 4.

Figure 9:
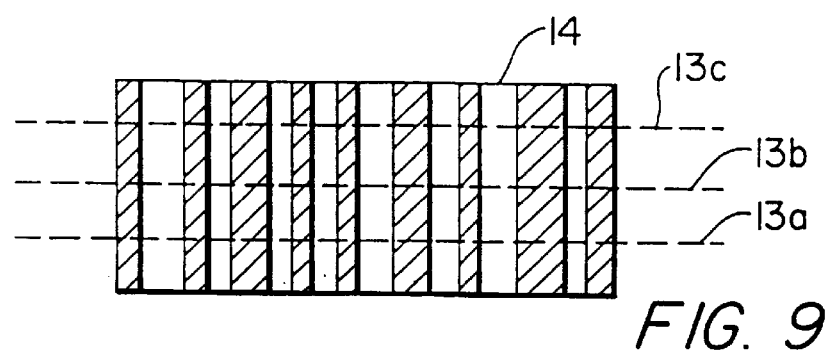
FIG. 9 is a diagram of a bar code symbol scanned with three scan lines.

As disclosed above with reference to FIG. 1, the number of scan lines utilized in the embodiment of FIG. 6 is not limited to the two scan lines 13a and 13b illustrated, but instead may be more than two scan lines 13a, 13b and 13c or, as illustrated in FIG. 9, a number of scan lines 13a, 13b and 13c may be advantageously used to scan a conventional bar code symbol 14 to obtain greater resolution, fault correction, etc. These three scan lines 13a, 13b and 13c are generated by a single light source using a beam splitter and a mechanical scan mirror as in FIG. 6.

Figure 10:
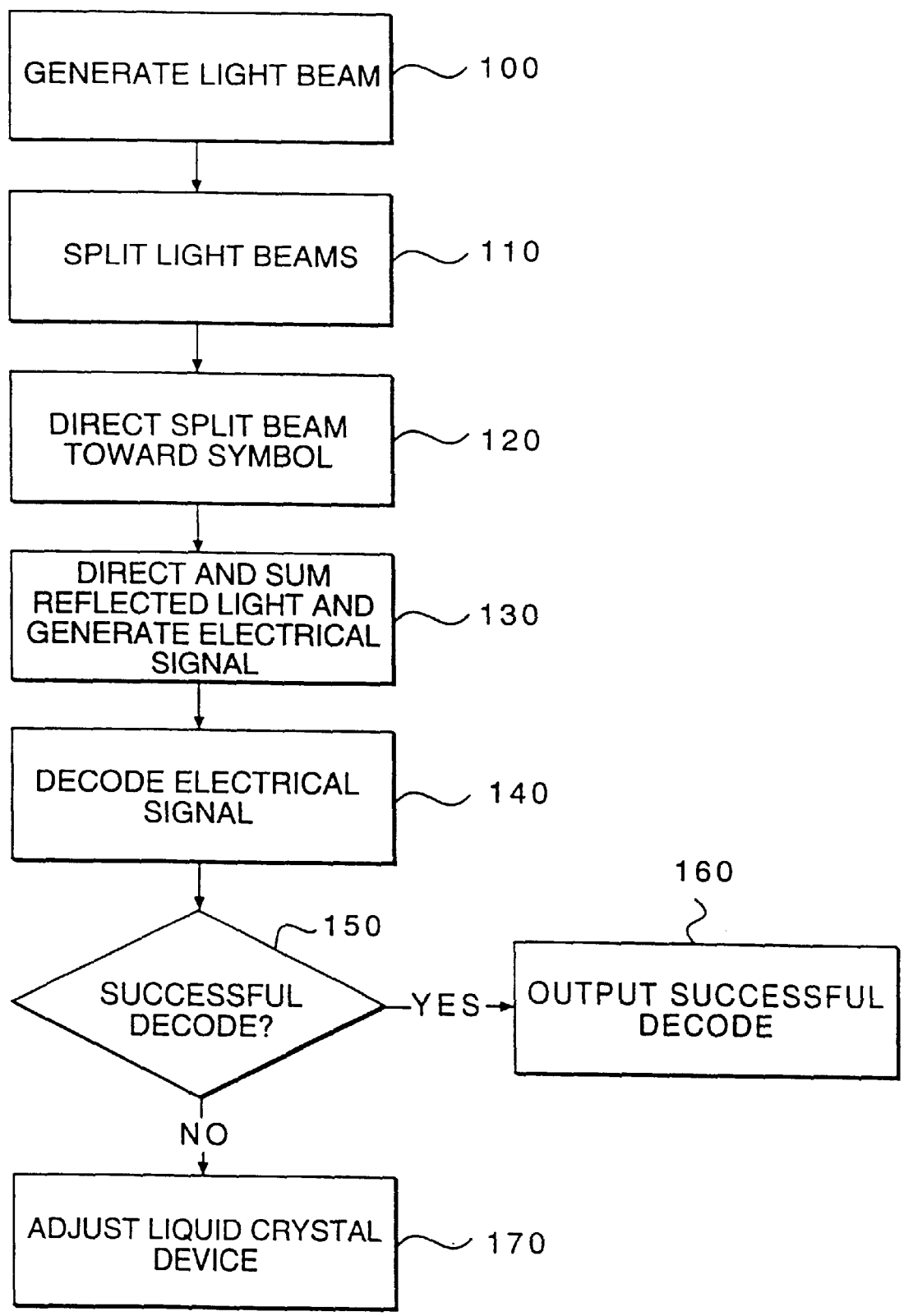
FIG. 10 is a flow chart of the steps for scanning a bar code symbol.

FIG. 10 is a flow chart of the steps for scanning a bar code using the scanner show in FIG. 6. A light beam is generated (step 100). The light beam is split using a liquid crystal device (step 110). The split light beams are directed toward a bar code using a moveable mirror (step 120). The light reflected from the bar code is detected and summed and an electrical signal is produced (step 130). This electrical signal is decoded (step 140). If the decoding is determined to be successful (step 150), the successful decode is output (step 160). Otherwise, electrical signals applied to the liquid crystal device are adjusted so that a successful reading of the bar code symbol may be obtained.

Figure 11:
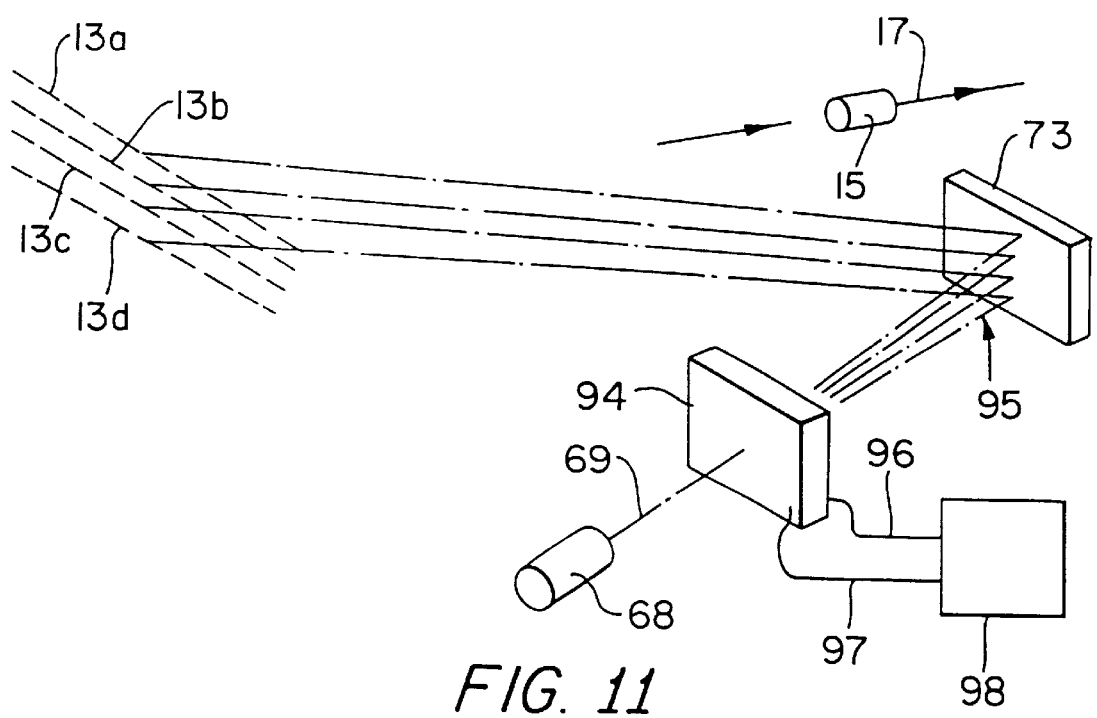
FIG. 11 is a diagrammatic view of a bar code scanner corresponding to FIGS. 1 or 6, employing multiple scan lines, using a single light source along with a liquid crystal device as a beam splitter.

Referring to FIG. 11, another embodiment of the invention is shown wherein multiple scan lines 13a, 13b, 13c and 13d are generated from a single laser source 68 by a liquid crystal device 94. As in FIG. 6, the beam 69 produced by the laser source 68 is split into multiple beams 95, and a mechanical device such as an oscillating mirror 73 moves these beams simultaneously across the area of the bar code symbol as the multiple scan lines 13a, etc. The liquid crystal device 94 has a voltage applied to it by lines 96 and 97, and the magnitude and frequency of the voltage determines the number of beams 95 produced and thus the number of scan lines. In this manner, the beam 95 may be dynamically changed from a single beam to a split beam, by varying a voltage source 98. For example, the signal produced on line 17 from the photodetector 15 may be of poor quality using one scan line, but may be decodable using multiple scan lines as discussed above with reference to FIGS. 2, 3 and 4, so the control program executed by the microprocessor 20 may cause the voltage generator 98 to switch to a multiple scan line condition if a valid decode is not obtained with one scan line. Alternatively, the control program may cause a switch from multiple scan to one scan line if more intensity is needed, since the beam splitting would reduce the level of illumination with a constant output of source 68.

Figure 12:
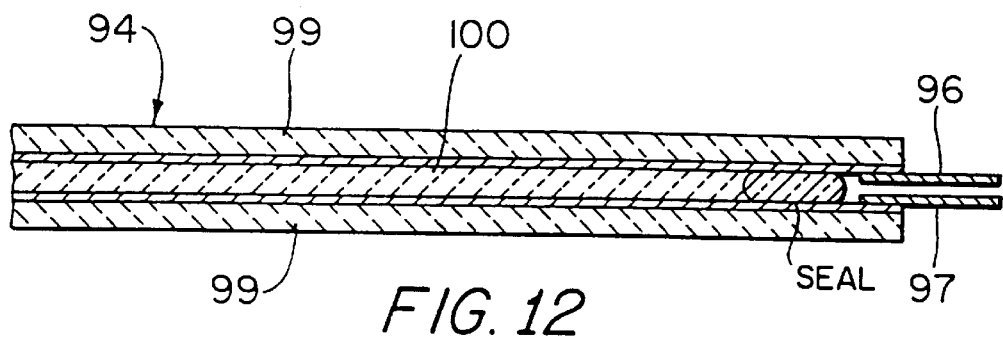
FIG. 12 is a sectional view of the liquid crystal device shown in FIG. 11.

Referring to FIG. 12, the liquid crystal device 94 may comprise two glass plates 99, each coated with a conductive film, and a liquid crystal material 100 sandwiched between the conductive plates. The material 100 may be, for example, a p-methoxy-benzylidene or p-n-butyl-aniline.

The liquid crystal device 94 of FIG. 11 is capable of spitting the beam 69 into more than two beams, and so the voltage source 97 may apply voltages of several levels to produce a selection of the number of scan lines needed, depending upon the conditions detected.

Although according to various features of the invention the scan generation may use oscillating mirrors, the embodiments of bar code scanner devices as with no moving parts as described above have several advantages for some purposes, when compared to scanners that use electromechanical components. First, the scan rate can be much faster, so the amount of time the laser is on can be reduced, lowering power drain. The faster speed will also allow a large number of scans to be accomplished for one "read" operation, then the data signals correlated with one another using a suitable algorithm to increase the precision of the decode. Second, the scan pattern can be flexibly adapted, i.e., the scan can be tailored to fit the particular bar code symbol and position: e.g., after an initial scan it is determined that the location and width of the bar code symbol in the field of view is at a specific place, and so the field is re-scanned at only this location, which will use less power. Third, after an initial scan there can be a re-scan of only a small part that showed an ambiguous decode, attempting to get a valid decode of only the troublesome part. Fourth, improvements in reliability can be provided in a device with no moving parts but instead implemented with only electronic components and fixed optical devices.

In another aspect, the bar code scanner methods disclosed above wherein multiple scan lines are employed provide other features of importance. The reliability of the decoding process can be enhanced by producing a composite signal from multiple simultaneous scans, where the effects of noise or defects can be minimized. Or, the increased scanning speed permitted by the use of no moving parts allows the multiple scans to be sequential, one line at a time, which allows the reflected light from the multiple scan lines to be separated when using only one photodetector; this arrangement permits scanning of multiple-row bar code symbols or the like.

While this invention has been described with reference to specific embodiments, this description is not meant to be construed in a limiting sense. Various modifications of the disclosed embodiments, as well as other embodiments of the invention and variations in the character of the disclosed or other embodiments, will be apparent to persons skilled in the art upon reference to this description. It is therefore contemplated that the appended claims will cover any such modifications or embodiments, or variations therein, as fall within the true scope of the invention.

What is claimed is:

1. A bar code scanner, comprising:
    a) a light source for generating a light beam;
    b) a beam splitter for splitting the light beam to produce a plurality of split light beams;
    c) a mirror system for simultaneously directing the split light beams in mutual parallelism toward and across a bar code symbol;
    d) a photodetector for summing light reflected by the bar code symbol from each of the split light beams and producing a corresponding electrical signal; and
    e) means for decoding the electrical signal.
2. A bar code scanner according to claim 1, wherein the beam splitter includes a liquid crystal device.
3. A bar code scanner according to claim 2, further including a voltage source for outputting electrical control signals of variable magnitude and frequency to the liquid crystal device for controlling the number of split light beams.
4. A bar code scanner according to claim 2, further including a voltage source connected to the liquid crystal device for controlling the number of split light beams output by the beam splitter.
5. A bar code scanner according to claim 1, wherein the mirror system includes a moveable scan mirror.
6. A method of scanning a bar code symbol comprising the steps of:
    a) generating a light beam;
    b) splitting the light beam using a liquid crystal device to produce a plurality of split light beams;
    c) simultaneously directing the split light beams in mutual parallelism toward and across the bar code symbol using a moveable mirror;
    d) detecting and summing light reflected from the bar code symbol for each of the split light beams and producing a corresponding electrical signal; and
    e) decoding the electrical signal.
7. A bar code scanner according to claim 1, wherein the beam splitter includes means for producing two of the split light beams.
8. A bar code scanner according to claim 1, wherein the beam splitter includes means for producing more than two of the split light beams.
9. A bar code scanner according to claim 1, wherein the bar code scanner is mounted in a hand-held housing.
10. A bar code scanner according to claim 1, wherein the bar code scanner is mounted in a stationary housing.
11. A bar code scanner according to claim 2, wherein the liquid crystal device includes two glass plates coated with a conductive film and separated by a liquid crystal material layer.
12. A bar code scanner according to claim 3, further including a microprocessor for controlling the voltage source.
13. A bar code scanner according to claim 5, wherein the mirror system further includes a motor for driving the moveable mirror.
14. A method according to claim 6, including the step of adjusting the moveable mirror via a motor.
15. A method according to claim 6, wherein the step of splitting the light beam includes the step of producing more than two of the split light beams.
16. An arrangement for electro-optically reading bar code symbols, comprising:
    a) a light source for generating a main light beam;
    b) a beam splitter for splitting the main light beam into a plurality of split light beams, and for spreading the split light beams apart from one another;
    c) a scanner for directing the split light beams toward a symbol for reflection therefrom, and for scanning the split light beams over the symbol in a scan pattern in which the split light beams extend in mutual parallelism across the symbol;
    d) a light detector for detecting light reflected from the symbol from each of the split light beams, and for generating an electrical signal indicative of detected light from all of the split light beams;
    e) a decoder for decoding the electrical signal to a decoded signal indicative of the symbol; and
    f) a controller for determining whether the decoding of the electrical signal was successful.
17. The arrangement of claim 16, wherein the controller is operatively connected to the beam splitter, for changing a number of the split light beams upon determining that the decoding was unsuccessful.
18. The arrangement of claim 17, wherein the beam splitter is a liquid crystal device having a control input, and wherein the controller generates and applies a control signal having a variable electrical characteristic to the control input to change the number of the split light beams.
19. The arrangement of claim 18, wherein the variable electrical characteristic is one of magnitude and frequency of a voltage.
20. A method of electro-optically reading bar code symbols, comprising the steps of:
    a) generating a main light beam;
    b) splitting the main light beam into a plurality of split light beams, and spreading the split light beams apart from one another;
    c) directing the split light beams toward a symbol for reflection therefrom, and scanning the split light beams over the symbol in a scan pattern in which the split light beams extend in mutual parallelism across the symbol;

d) detecting light reflected from the symbol from each of the split light beams, and generating an electrical signal indicative of detected light from all of the split light beams;

e) decoding the electrical signal to a decoded signal indicative of the symbol; and f) determining whether the decoding of the electrical signal was successful.

21. The method of claim 20; and further comprising the step of changing a number of the split light beams upon determining that the decoding was unsuccessful.

* * * * *